United States Patent [19]

Ennis et al.

[11] Patent Number: 4,608,566

[45] Date of Patent: Aug. 26, 1986

[54] FOLIAGE-PENETRATION SURVEILLANCE RADAR

[75] Inventors: David G. Ennis; John M. Smith, both of Ridgecrest, Calif.

[73] Assignee: The United States of America as represented by the Secretary of the Navy, Washington, D.C.

[21] Appl. No.: 332,397

[22] Filed: Dec. 16, 1981

[51] Int. Cl.$^4$ .............................................. G01S 13/00
[52] U.S. Cl. ................................................... 343/5 PD
[58] Field of Search ............... 343/5 PD, 16 M, 5 SA

[56] References Cited

U.S. PATENT DOCUMENTS

| | | | |
|---|---|---|---|
| 3,500,395 | 3/1970 | Foster et al. | 343/5 SA |
| 3,733,603 | 5/1973 | Johnston | 343/5 SA |
| 4,097,868 | 6/1978 | Borowick | 343/834 |
| 4,114,163 | 9/1928 | Borowick | 343/834 |
| 4,346,382 | 8/1982 | Bose et al. | 343/17.2 PC |

Primary Examiner—Theodore M. Blum
Attorney, Agent, or Firm—Robert F. Beers; Joseph M. St.Amand; Thomas M. Phillips

[57] ABSTRACT

A pseudo-noise modulated continuous wave radar for providing foliage penetration as a means for quickly establishing perimeter surveillance of an emplacement in heavily foliaged environments. An RF signal is radiated into free space by means of a static antenna array. The return signal is received by the receiving antenna which is composed of eight-dipoles, phased to create three receive lobes. The three lobes are utilized in an amplitude monopulse technique to determine the azimuthal direction to the detected target with respect to the radar site.

4 Claims, 11 Drawing Figures

FOLIAGE-PENETRATION SURVEILLANCE RADAR

BACKGROUND OF THE INVENTION

The present invention relates to field surveillance systems and in particular to those surveillance systems that utilize a radar system to provide the monitoring of moving objects within a perimeter of surveillance. The prior art includes television surveillance systems such as that of the Kartchner U.S. Pat. No. 3,531,588 which includes an automatic television apparatus for continuously scanning a security protected area. Another type of surveillance system is that of Swartz, et al U.S. Pat. No. 3,314,066 in which a CW microwave transmitter is placed at one extremity of the scene to be guarded for sending energy to a reflector at the other extremity of the guarded scene.

The recent development capability for rapid deployment of tactical forces into enemy territory has emphasized the need for an improved method for quickly establishing perimeter surveillance of an emplacement. Presently known lightweight radars are only capable of operating in areas of little or no foliage with no wind or rain. Radars without these restrictions are large, heavy, complicated, and difficult to operate.

SUMMARY OF THE INVENTION

The present invention provides for an integrated tactical radar system having the ability to transmit through trees and bush, discriminate against the extremely high levels of clutter return produced by the foliage, and detect enemy personnel and vehicles moving under cover of the foliage. An RF carrier signal is biphase-modulated by a pseudo noise code and transmitted by a single lobe antenna. The return signal is received by a plurality of dipoles, phased to create three receive lobes. Each lobe is connected to a separate receiver input and processing channel. The three lobes are utilized in an amplitude monopulse technique to determine the azimuthal direction to the detected target with respect to the radar site. Accordingly, an object of the invention is the provision of a lightweight portable surveillance radar that can be transported by a single man that will allow small, highly mobile forces to quickly establish defense perimeters to detect enemy personnel through foliage, day or night, and under fair or adverse weather conditions.

Another object in the invention is the provision of a foliage penetration battlefield surveillance radar that is phase-modulated with a binary, maximal-length pseudo random-noise code that spreads the transmitted energy across a broad spectral band, and reduces the beacon effect of the transmission and increases clutter rejection.

A further object of the invention is the provision of a foliage penetration battlefield surveillance radar utilizing balanced processing means for detecting approaching or receding targets in the presence of stationary or oscillating clutter returns.

Other objects, advantages and novel features of the invention will become apparent from the following detailed description of the invention when considered in conjunction with the accompanying drawings wherein:

Figure 1:
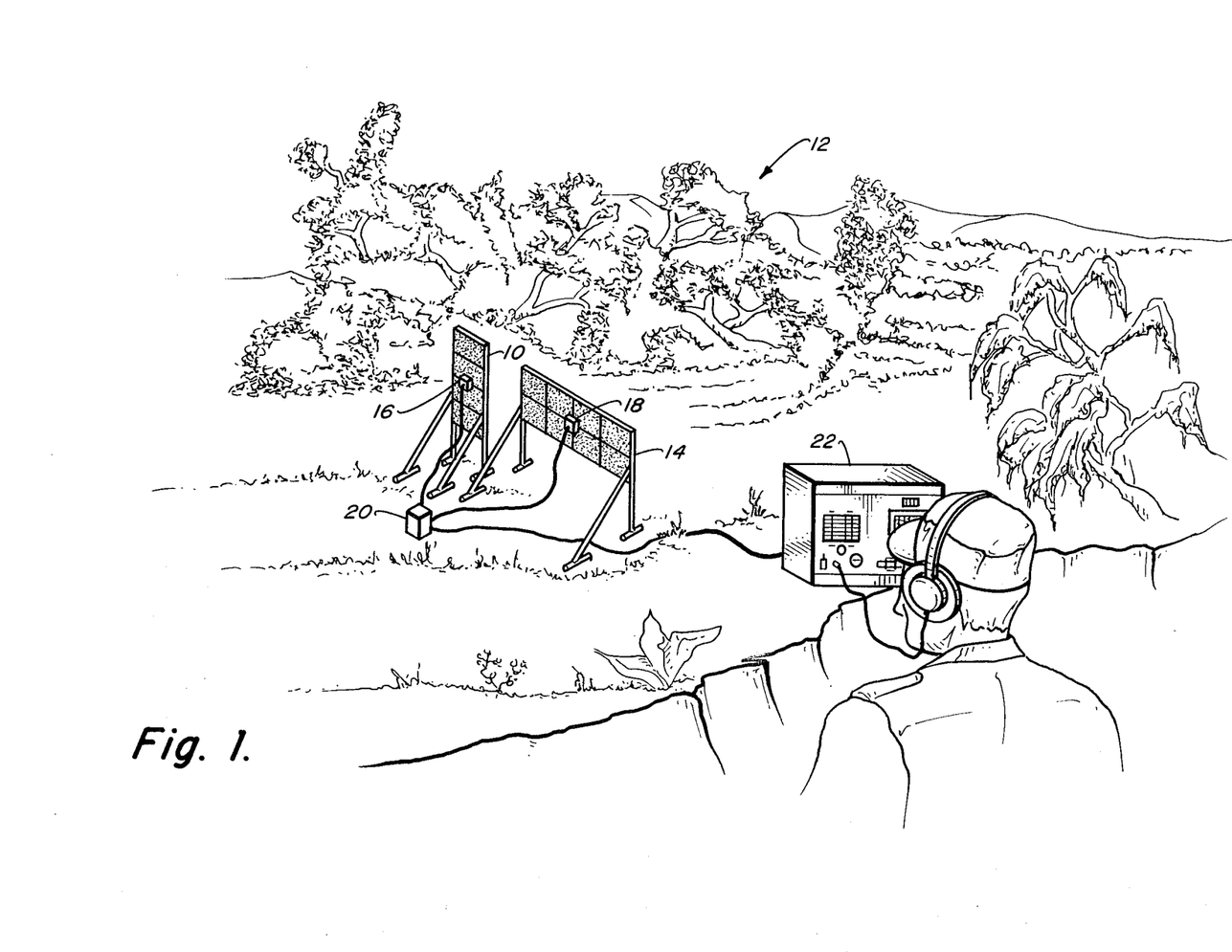
FIG. 1 shows a typical deployment of the system embodying the invention.

Referring now to the drawings wherein there is shown in FIG. 1, a typical deployment of the system embodying the invention. A single transmit antenna array 10 is used to illuminate a sector 12 of about 120° of an area that is under surveillance. The central portion of this sector is interrogated by a single receive phased-array antenna 14. The receive antenna 14 receives three overlapping beams of RF energy. These three receive beams determine the target azimuth utilizing amplitude monopulse techniques. Target return signal amplitudes in the three beams are compared to locate the target in azimuth to the required accuracy. This allows the use of a stationary antenna array to determine target azimuth as opposed to the mechanical scan antennas utilized by most battlefield surveillance radars.

Throughout the description of the present invention, it is to be understood that modular design is employed throughout to maximize transportability, maintainability, and utility to the user. The two collapsible antenna arrays 10 and 14 are erected to cover the required 120° azimuth sector. Transmitter 16 and receiver 18 modules are mounted directly on the antenna arrays 10 and 14 respectively, to reduce cable lengths to a minimum.

Signal processor and power unit 20 are contained in a single package, and placed near the antenna arrays. A control unit 22 is sited at a manning station that may be separated from the other modules by any convenient distance. It is to be understood that the modularity principle is further extended in each of the electronic modules to the level of circuit cards or devices to maximize field maintainability.

Figure 2:
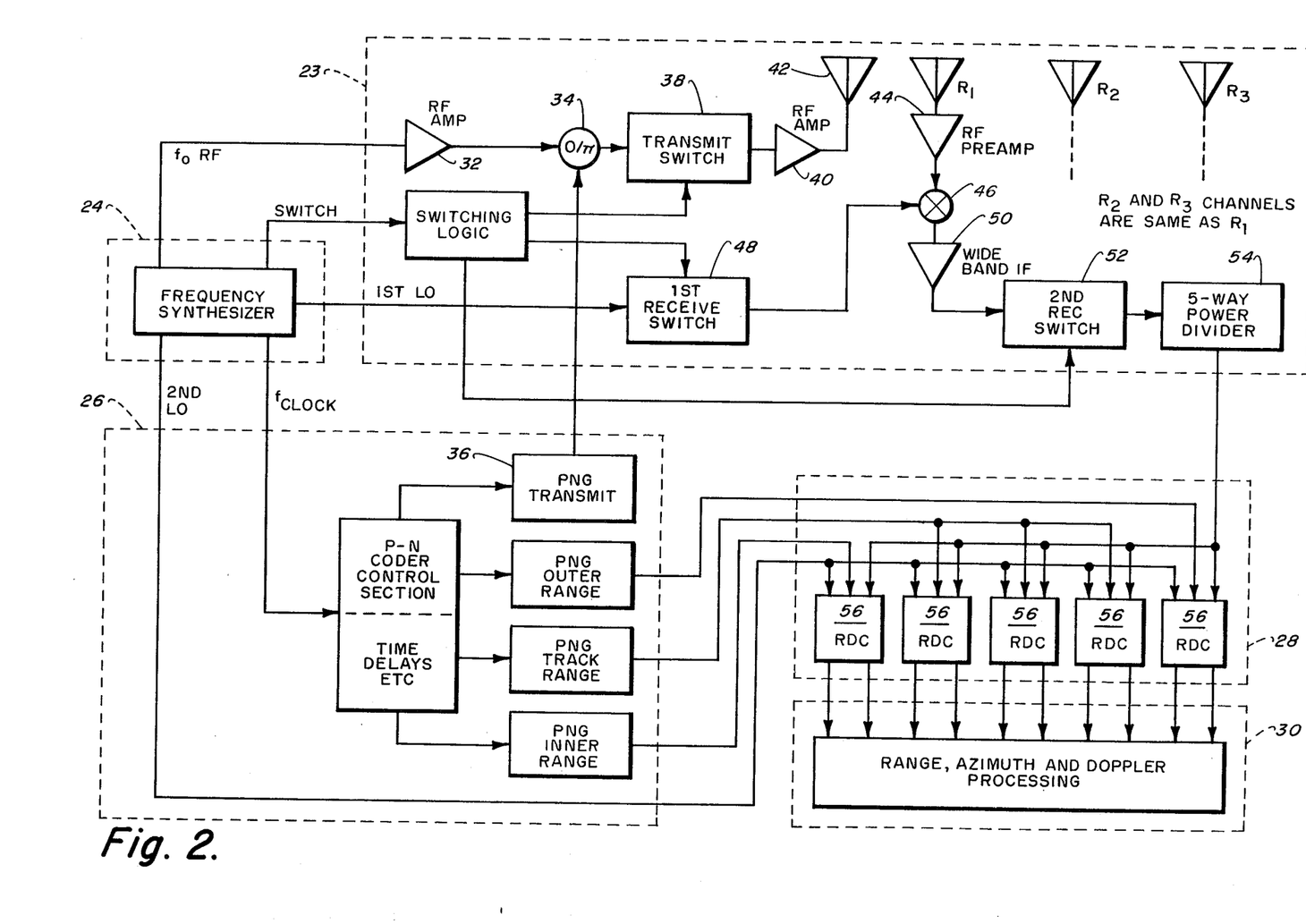
FIG. 2 is an overall block diagram of the radar system embodying the invention.

Referring now to FIG. 2 which is an overall block diagram of the radar system that has been divided into five major sections: RF section 23; frequency synthesizer 24; code generators and control system 26; receiver video and IF demodulation 28; and signal processing circuits 30.

In RF section 23, the frequency-synthesizer-generated RF carrier signal is initially amplified in RF amplifier 32 and fed to modulator 34 where the signal is biphase-modulated by a pseudo noise code generated by the transmit pseudo noise generator 36. The biphase modulated signal is coupled through transmit switch 38 where a 50% duty cycle is superimposed and amplified in a broadband RF power amplifier 40. The amplified RF signal is radiated into free space by means of transmit antenna array 42. Transmit antenna array 42 may be composed of four-dipole phased array that illuminated an azimuthal sector of 120° as shown in FIG. 1.

The return signal is received at receive antenna 14 (FIG. 1) and as shown is composed of eight dipoles, phased to create three receive lobes. The three receive lobes are represented by R1, R2, and R3. Each lobe is connected to a separate receiver processing circuit. To simplify the description of the invention, only one of the receivers will be described. Each receiver lobe covers 40° of the 120° illuminated the transmit antenna 42. The signal from antenna R1 is amplified in RF preamplifier 44 and fed through mixer 46 where it is mixed with the first local oscillator signal from frequency synthesizer 24 and heterodyned down to the IF frequency. Transmit leakage filtering is accomplished by means of first receive switch 48 which prevents the first local oscillator signal from being fed to mixer 46 during the transmit cycle. The IF signal out of mixer 46 is amplified in wide band IF amplifier 50 and fed to second receive switch 52 which is used to eliminate noise generated by the receiver during the unused portion of the receive signal, specifically that portion when the first receive switch has the receiver front end turned off. The output of second receive switch 52 is fed to five-way power divider 54. The outputs from five-way power divider 54 are fed to a plurality of range detection channels 56 in the IF demodulator section 28.

Figure 3:
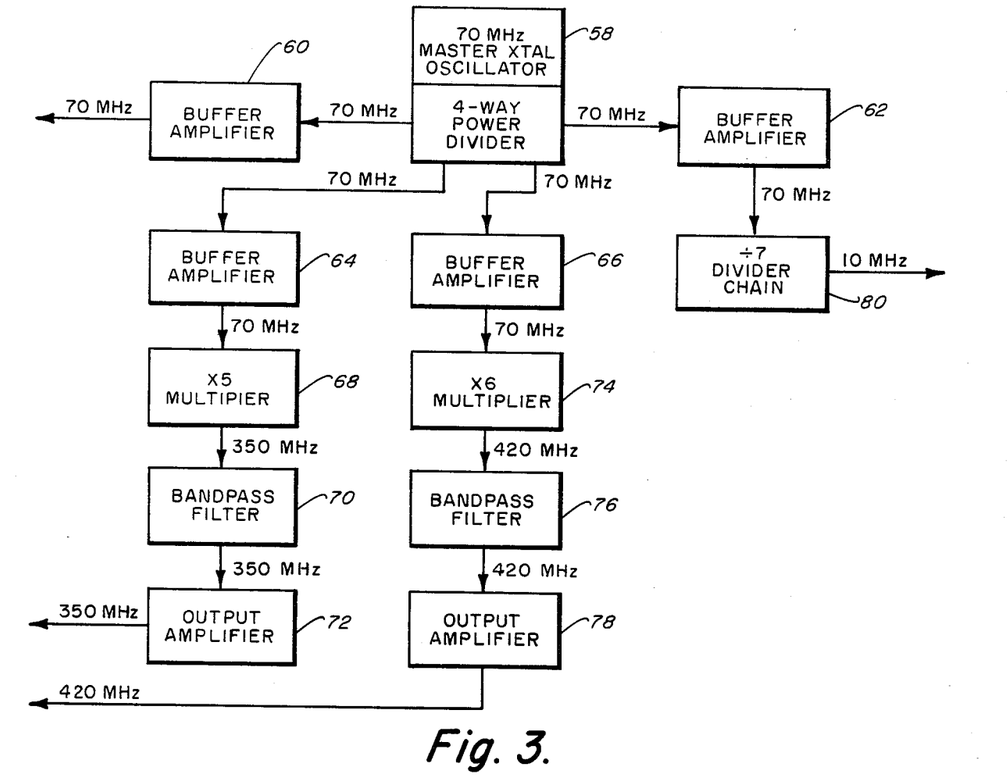
FIG. 3 is a block diagram of the frequency synthesizer of the embodiment of FIG. 2.

The RF carrier, first and second local oscillator switch clocks, and system clock are all generated in frequency synthesizer 24. All synthesizer outputs are derived as shown in FIG. 3. As shown, the output from master crystal oscillator 58 is fed through a four-way power divider to amplifiers 60, 62, 64 and 66. The second local oscillator frequency is the same as the frequency of the master crystal oscillator and is taken directly from buffer amplifier 60. The first oscillator signal is derived by feeding the output of buffer amplifier 64 to a times five multiplier 68. The output of multiplier 68 is fed through a bandpass filter 70 and into an output amplifer 72 to provide the first local oscillator signal. In a similar manner the RF carrier signal is provided by feeding the output of buffer amplifier 66 to a times six multiplier 74, through bandpass filter 76 and output amplifier 78. The system clock is derived by dividiing the output of buffer amplifier 62 by seven in divider chain 80. In the example shown, the master crystal oscillator 58 has an output frequency of 70 MHz, 1st local oscillator an output frequency of 350 MHz, 2nd local oscillator an output frequency of 70 MHz, RF frequency of 420 MHz and system lock frequency of 10 MHz.

Figure 4:
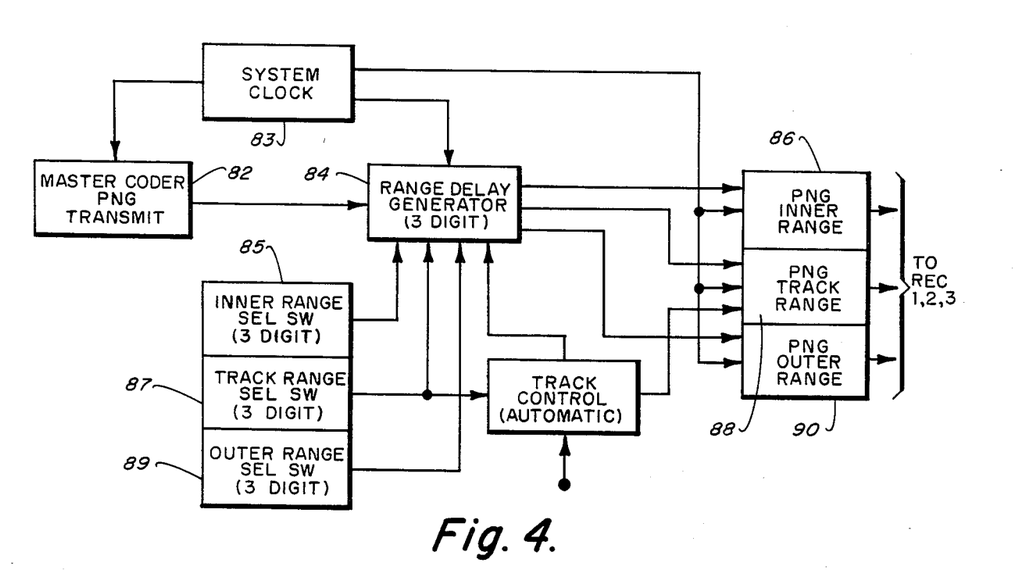
FIG. 4 is a block diagram of the code generator and control system of FIG. 2.

Code generator and control system 26 is shown in detail in FIG. 4. Master coder pseudo noise generator 82 supplies the code to modulate the RF carrier and is used as a reference to set the range delay code generators 86, 88 and 90. All of the pseudo noise codes generated are identical in content and only differ in time with respect to each other. Timing is provided by the system clock 83.

Figure 5:
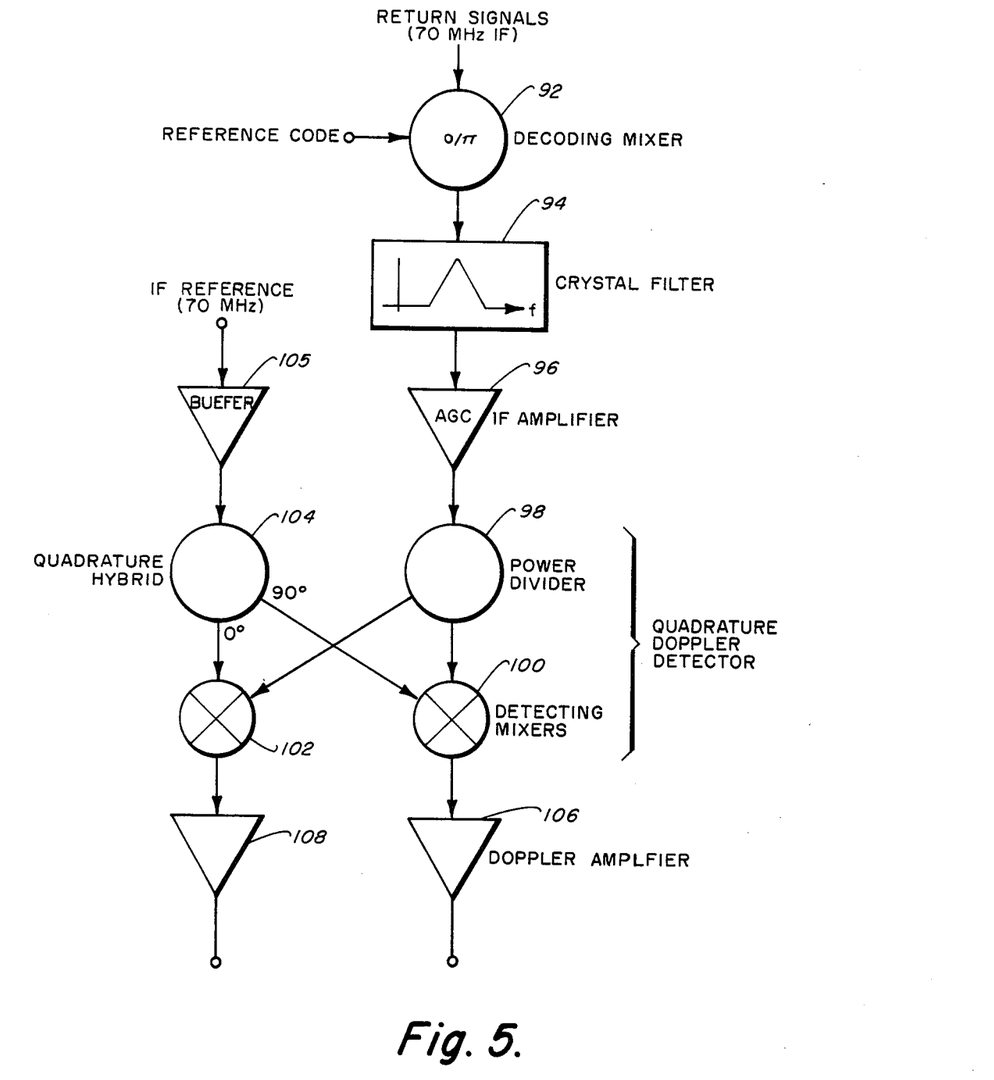
FIG. 5 is a block diagram of one of the range detection channels of FIG. 2.

The index pulse from master coder 82 initializes a range counter in range delay generator 84. Range counter, in the example provided, counts to 32,767 and repeats, serves as a real-time program counter. When the count reaches the state corresponding to the input from inner range selector switch 85 setting, a pulse is generated setting the inner range code generator 86 to the "all ones" state. The output from inner range generator 86 with the proper delay for the inner range is then fed to the range decode circuits 56 as the reference code (FIG. 5).

In the same manner the same sequence occurs for track range generator 88 and outer range code generator 90 from range selector switches 87 and 89 respectively.

Each code generator consists of a 15 stage shift register, exclusive OR gates, and synchronizing logic. The shift register and exclusive ORs are interconnected to generate a maximal-length pseudo-random word. The resultant coder output consists of:

$$N = 2^n - 1 = 2^{15} 1 = 32,767 \text{ bits}$$

With a system clock frequency of $f_c = 5$ MHz the resultant word lines are spaced at $$f_w = \frac{f_c}{N} = \frac{5 \times 10^6}{32767} \text{ Hz} = 152.6 \text{ Hz}$$

This allows a theoretical maximum Doppler signal of approximately 75 Hz. Specific locations of exclusive ORs and feedback connections are derived from Petersons' table of irreducible polynomials. Selection of the proper polynomials from this table yields maximal-length PN codes.

The pseudo noise codes from the inner range 86, track range 88 and outer range 90 code generators are fed to the range detection channels 56 of the video and IF demodulator 28.

The range detection channel, RDC, is shown in block diagram form in FIG. 5. The return signal from power divider 54 is fed as one input to decoding mixer 92 with the other input being the reference code from one of the code generators of FIG. 4. Creating a narrow range of detection is the fundamental principle employed in the surveillance system for clutter rejection. Bascially, a target echo code that is identical bit for bit with a code from a range code generator will be demodulated and produce an IF signal. If the target is moving, the IF signal will be AM-modulated by the target Doppler frequency. If the return signal is not in time synchronization with the reference range code, the IF target echo energy will remain spread across a broad frequency band. If the detector output for an in-range target is assigned a value of 1 volt, then an out-of-range target will be Tgt out of range $= 20 \log N = 20 \log 32,767$ 90 dB less in amplitude.

After range detection, the IF signal is filtered and amplified. Filtering is required to reject the frequency spectrum of the out-of-range clutter. Even though the clutter power spectrum is spread, there is such a large volume of clutter that is produces high return levels that could cause a broadband amplifier to saturate and be unable to properly amplify the in-range target signal. At this point in the demodulation process, an extremely narrow-band IF filter ($f_{IF} + f_D$) is used.

The output of decoding mixer 92 is fed to crystal filter 94 which is an extremely narrow-band IF filter ($f_{IF} + f_D$). The IF signal out of crystal filter 94 is amplified in IF amplifier 96 and divided equally in a power divider 98. One of the outputs from power divider 98 is fed to detecting mixer 100 with the other output being fed to detecting mixer 102. The other inputs for mixers 100 and 102 are from quadrature hybrid power divider 104. The input to hybrid divider 104 is the 70 MHz reference local oscillator signal from the frequency synthesizer 24 and is fed through a buffer 105. The 70 MHz reference local oscillator signal is coherent with the signal intermediate frequency. Any sum and difference frequencies generated in mixers 100 and 102 are caused by target and clutter movement.

Since one of the reference intermediate frequency signals is 90° out of phase with the other, the resulting Doppler frequencies will be in-phase quadrature. The quadrature Doppler frequencies are next amplified in Doppler amplifiers 106 and 108 and then applied to the balanced processor shown in FIG. 6.

Figure 6:
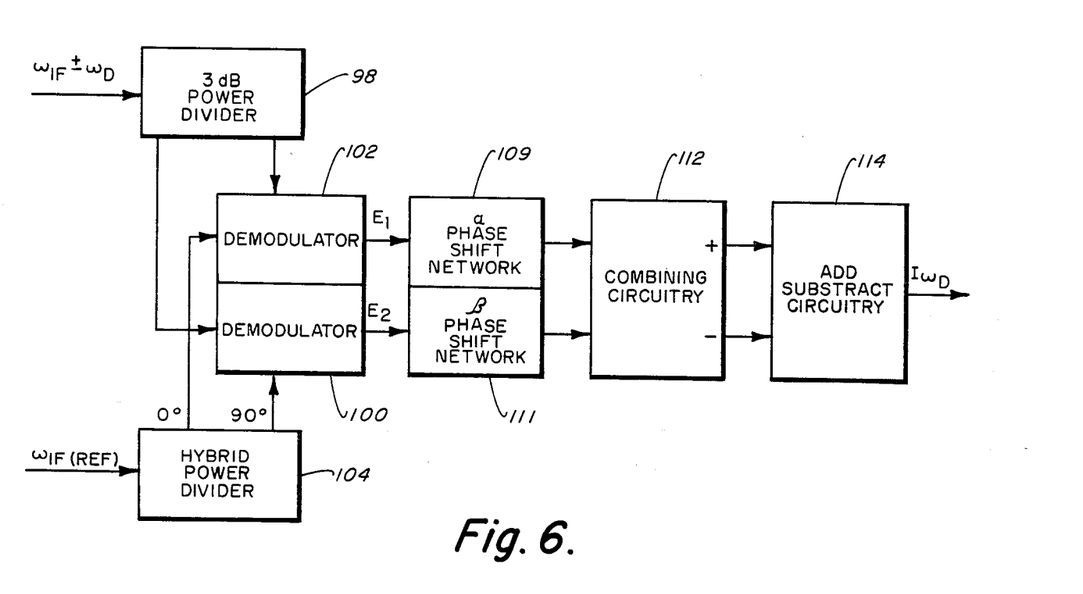
FIG. 6 is a general block diagram of the balanced processor of FIG. 2.
Figure 7:
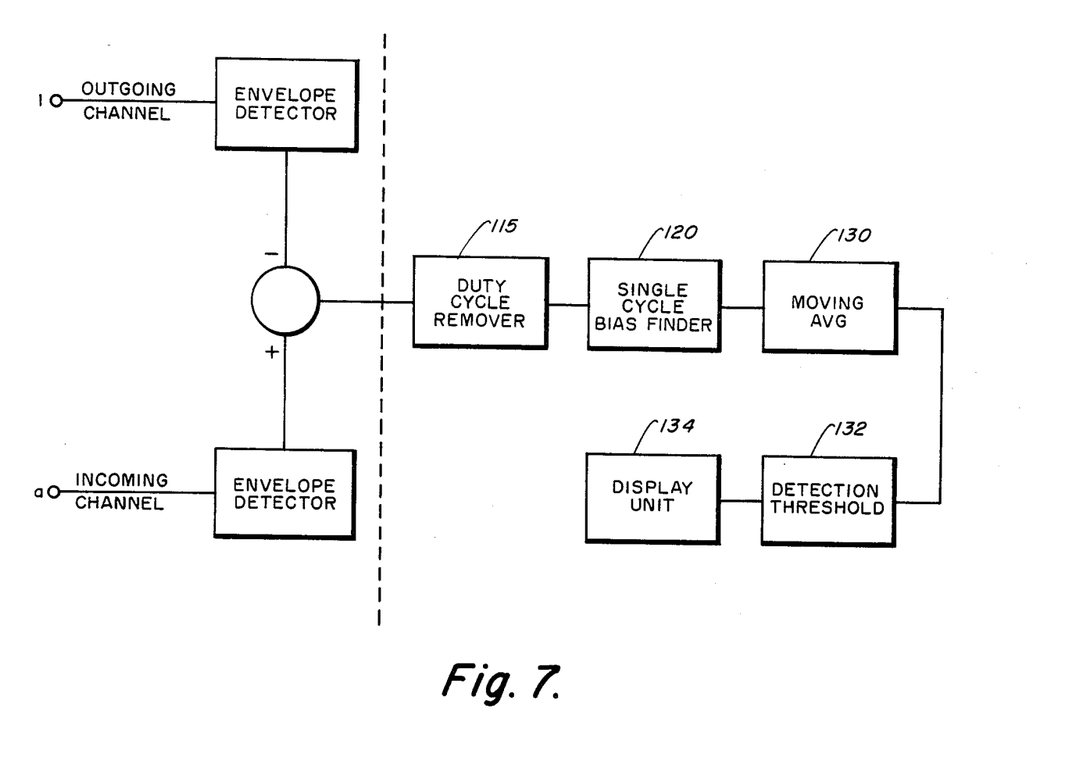
FIG. 7 is a general block diagram of the post balanced processor signal-processing.
Figure 8:
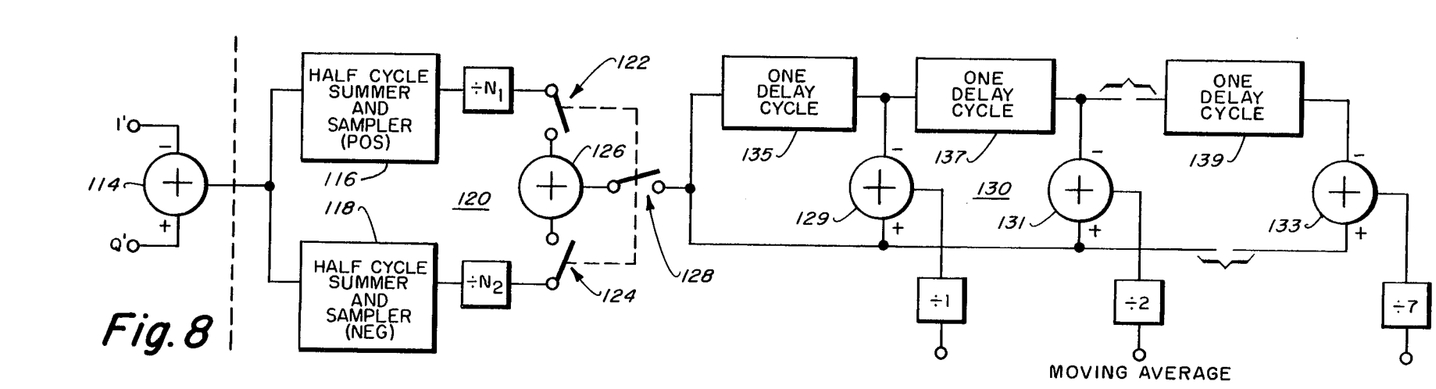
FIG. 8 is a detailed block diagram of the signal processing of FIG. 7.

FIG. 6 is a general block diagram of the balanced processor. The Doppler detector stage of range decoding channel, FIG. 5, is part of the balanced processor. The output signals from demodulators 102 and 100, $E_1$ and $E_2$ respectively, are further phase shifted in phase shift networks 109 and 111 to introduce an additional phase difference between the two channels. The outputs from phase shift networks 109 and 111 are combined in combining circuitry 112. The vector sum of the $\alpha$ channel signal appears at the positive terminal of the combining circuitry 112 while the vector difference appears at the negative terminal. The processing of the signals through the balanced processor is described by D. E. Norgaard, "The Phase-shift Method of Single-Sideband Signal Generation", *IRE Proceedings,* Vol. 44 (December 1956), pp 1735–43. The output signals from combining circuitry 112 are fed to add substract ciruitry 114. The output signal from add substract circuitry 114 represents the difference in amplitude of the two Doppler sidebands out of combining circuitry 112. If the signals are of different polarity they are added and if of the same polarity are substracted. The voltage out of the balanced processor is in a cyclical form with clutter present, $\pm \omega_D$, and fluctuates back and forth between positive and negative polarities at a rate dependent on clutter conditions. A true integrator would integrate a full cycle of clutter-only information and give a nearly zero output at the end of the cycle. This residual voltage will be misconstrued as a target if it rises above the detection threshold. To overcome this problem, the duty cycle remover shown in FIGS. 7 and 8 is utilized. The duty cycle remover 115 (FIG. 7) consists of two summing circuits, 116 and 118 (FIG. 8) for summing the inbound and outbound signals respectively coming from the balanced processor. The outputs from summers 116 and 118 are sampled at a fixed rate N, summed and averaged by the number of samples $N_1$ and $N_2$ to provide an average wave of the sampled wave form. At the end of the summation period, the sum is divided by the number of samples taken. The number of samples (N1 and N2) depends on how long the signal from the balanced processor stays either positive or negative. A positive signal represents incoming target while the negative signal represents a receeding target.

Following the duty cycle remover is the single-cycle bias finder 120. This consists of switches 122, 124 and summer 126. The values summed in the duty cycle remover are held for one complete cycle of the signal coming from the balanced processor. At the end of the cycle the values are summed together in the single-cycle bias finder.

The sum information from the single-cycle bias finder is transfered by means of switch 128 to the moving average integrator 130 where the signal is integrated and passed on to the threshold circuit 132 and display 134. The output from summing circuit 126 is fed to a sequence of summing circuits 129, 131, and 133 directly and through delay circuits 135, 137 and 139 where it is added as delayed and undelayed signals to provide an average output which is an integration of the input waveform. Delay circuits 135, 137, and 139 may be shift registers.

Figure 9:
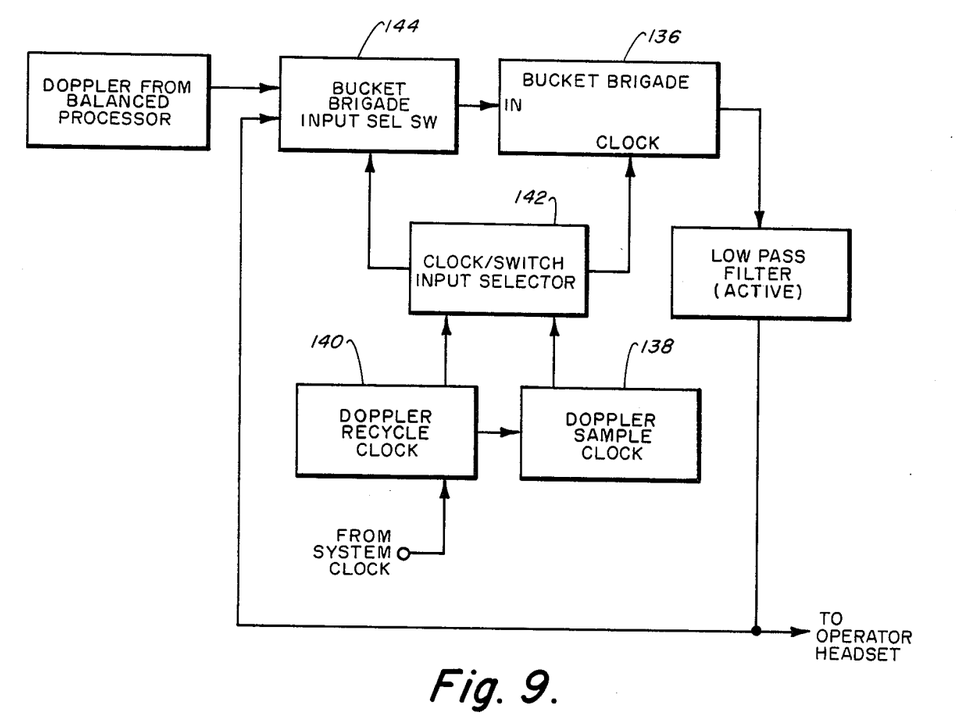
FIG. 9 is a block diagram of a doppler frequency multiplier used in detecting slow moving targets.

Because of the extremely low frequency of the Doppler output that would be generated by a moving target such as a person walking or running (the maximum frequency generated by a running man is approximately 19 Hz) which is well below the frequency range of normal human hearing the doppler frequency multiplier shown in FIG. 9 is utilized. The Doppler signal from the detection channel (FIG. 5) is fed to a bucket brigade 136. Essentially the bucket brigade 136 is an analog shift register using capacitors as the memory elements. The signal is sampled by the bucket brigade circuit at the sample clock rate from sample clock 138 and is stored as a series of charges on the memory capacitors. The charge is then passed from stage to stage at the transfer clock rate from recycle clock 140. Sampling and recycling is controlled by clock switch selector 142 and input selector switch 144. The relationship between the sample clock ($C_S$) and the transfer clock ($C_T$) determines the basic operation of the circuit. That is, there are three general conditions:

1. $C_S = C_T$, which implies a delay line;
2. $C_S > C_T$, which implies time expansion
3. $C_S < C_T$, which implies time compression The latter condition is the one that will be utilized in the Doppler frequency multiplier. Recycling the stored target doppler at a higher rate than the input sample rate increases the doppler frequency by the ratio of the two clocks; i.e., $$f_D = f_D \frac{C_T}{C_S},$$

where $f_D$=doppler frequency. A ratio will be selected that will translate the doppler frequency into the audible range of 50 to 5000 Hz. Low pass filter 146 filters out noise generated by the clocking process.

Azimuthal location of the target with respect to radar boresight is achieved using amplitude monopulse techniques. The information received in the three beams (right, left and center) of the receive antenna (See FIG. 10.) is processed in the following manner. The center, right and left channel outputs are sampled in AND gates 150, 152 and 154, held in latches 156, 158 and 160 respectively. Right and left channel outputs are compared in comparator 162 to determine which is larger. The larger channel output determines whether the azimuth is right or left of boresight.

Figure 10:
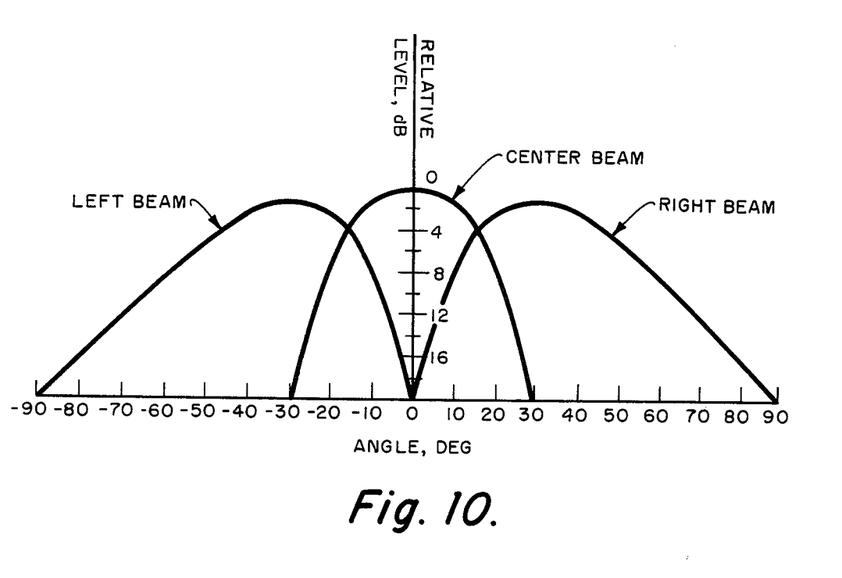
FIG. 10 is a diagram of the antenna beam patterns of the radar system of FIG. 2.
Figure 11:
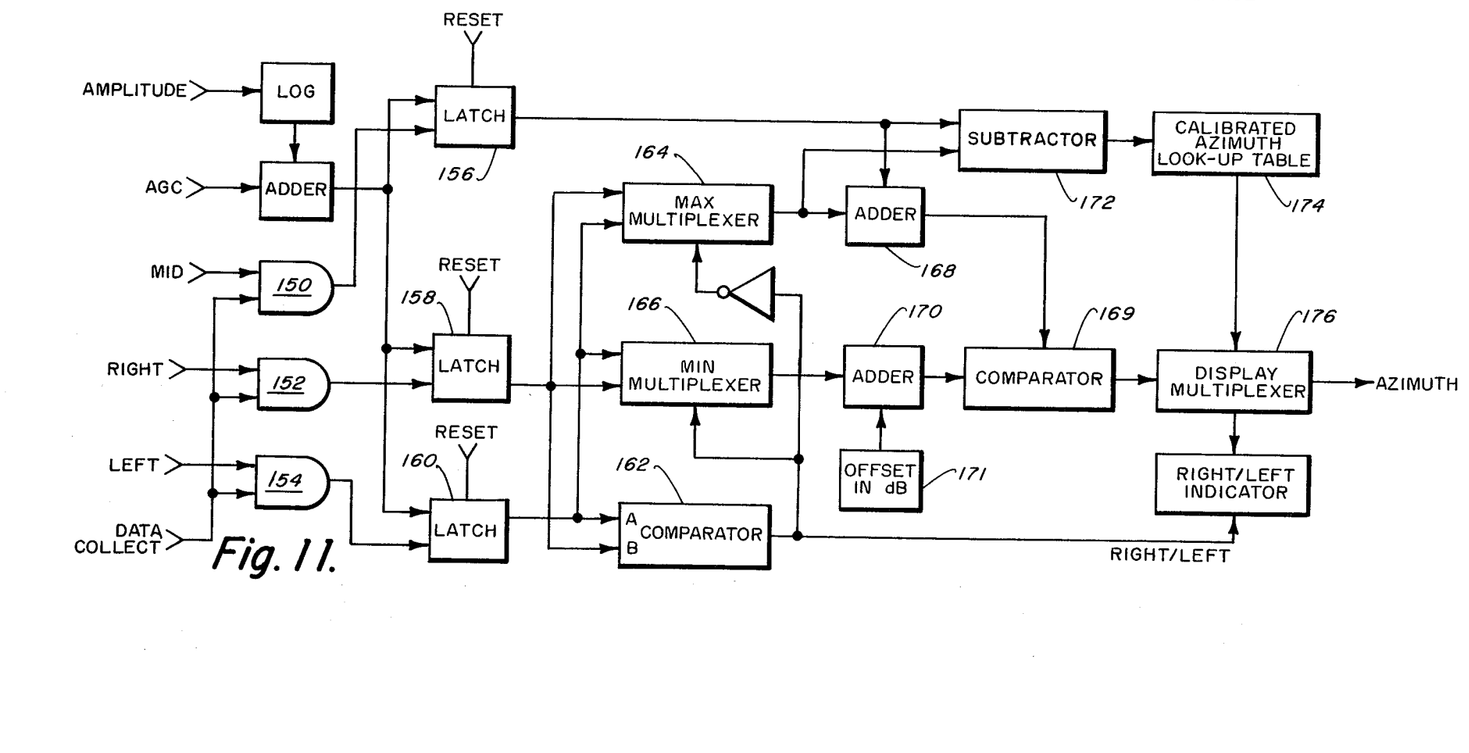

Side lobe inhibiting is accomplished by summing the larger output of the left or right channel and the midchannel output and comparing it to the minimum output of the left or right channel. This is done by means of multiplexer 164 and multiplexer 166 to provide maximum and minimum input signals to adders 168 and 170 respectively. The maximum signal is fed to adder 168 and substractor circuit 172. Subtractor circuit 172 provides an output that is the difference between center signal and which ever signal (left or right) is larger. This value is compared with calibrated azimuth look-up table 174 to determine the target azimuth which is fed through display multiplier 176. A programmable read only memory may be used for this purpose. If the difference is less than a predetermined number of dB, the azimuth measurement is inhibited and a right/left indication is displayed.

The larger and center signals fed to adder 168 are added and fed to comparator 169. The smaller of the left or right signals is fed to adder 170 where it is added to an offset signal 171. Offset signal 171 depends on the necessary sidelobe inhibiting required by the characteristics of the receiving antenna. The two signals are compared in comparator 169 to determine if the target is within the 120° sector under surveillance. If the target is outside the 120° sector display multiplier 176 is inhibited from providing an azimuth output signal. Otherwise, azimuth will be displayed in degrees.

Obviously many modifications and variations of the present invention are possible in the light of the above teachings. It is therefore to be understood that within the scope of the appended claims the invention may be practiced otherwise than as specifically described.

We claim:

1. In a surveillance system of the type utilizing a radar system for the monitoring of moving objects within a perimeter of surveillance that includes trees and plants bearing foliage, the combination comprising:

transmitter means for transmitting a modulated RF signal to illuminate the area under surveillance, receiver means for receiving reflections of said transmitted RF signal, signal processing circuit means coupled to said receiver means for providing an output signal which indicates azimuthal direction of a detected target with respect to the radar site, said signal processing circuit means includes a first summing circuit for summing and sampling inbound signals and a second summing circuit for summing and sampling outbound signals and divider circuit means connected to each of said first and second summing circuits for dividing the sums by the number of samples taken which is proportional to the length of time the signal remains either positive or negative to prevent full cycle integration to remove clutter when the output signal is fluctuating back and forth between positive and negative polarities.

2. The system of claim 1 wherein said receiver means includes a single receive phased-array antenna for receiving three overlapping beams of RF energy.

3. The system of claim 2 wherein said azimuthal direction of a detected target is determined by means of a first circuit comparison means for comparing the right and left channel outputs to determine which is larger, and circuit subtractor means for subtracting the center channel signal from the larger of said compared channel outputs to provide a signal directly proportional to azimuth.

4. The system of claim 3 further including side lobe inhibiting circuit means comprising a first summing circuit for summing the center channel output signal with the larger of the output signal from the right and left output channels, and second comparator circuit means for comparing the output of said first summing circuit to the smaller of the output signals from the right and left output channels for providing an azimuth measurement inhibiting signal when the difference is less than a predetermined dB.

* * * * *